United States Patent [19]

Argade et al.

[11] Patent Number: 5,724,505
[45] Date of Patent: Mar. 3, 1998

[54] APPARATUS AND METHOD FOR REAL-TIME PROGRAM MONITORING VIA A SERIAL INTERFACE

[75] Inventors: Pramod Vasant Argade; Michael Richard Betker, both of Allentown; Shaun Patrick Whalen, Wesconsville, all of Pa.

[73] Assignee: Lucent Technologies Inc., Murray Hill, N.J.

[21] Appl. No.: 647,852

[22] Filed: May 15, 1996

[51] Int. Cl.⁶ ................................................ G01R 31/28
[52] U.S. Cl. ................................................ 395/183.21
[58] Field of Search ................. 371/22.1; 395/183.21, 395/183.1, 183.11, 183.14, 183.15, 184.01; 364/265.3, 265.6, 267, 267.2, 267.4, 267.7, 267.91, 267.8

[56] References Cited

U.S. PATENT DOCUMENTS

| | | | |
|---|---|---|---|
| 5,355,369 | 10/1994 | Greenberger et al. | 371/22.3 |
| 5,386,565 | 1/1995 | Tanaka et al. | 395/700 |
| 5,615,357 | 3/1997 | Ball | 395/500 |

FOREIGN PATENT DOCUMENTS

| | | |
|---|---|---|
| 0720093 | 7/1996 | European Pat. Off. . |
| 0762276 | 3/1997 | European Pat. Off. . |
| 7-152604 | 6/1995 | Japan . |

*Primary Examiner*—Hoa I. Nguyen

[57] ABSTRACT

A digital microprocessor having a processor core is provided with trace recording hardware capable of receiving, analyzing and temporarily storing data indicative of program instructions (i.e., instruction types) executed by the processor core and of their respective addresses. The trace recording hardware outputs an abbreviated real-time program trace, containing minimum data necessary to reconstruct a full program trace, via a JTAG port to an external debug host computer where a user may reconstruct the full program trace with reference to a program listing. The abbreviation scheme used by the trace recording hardware is preferably achieved by comparing instruction types received from the processor core to at least one pre-defined instruction type, and abbreviating or discarding the corresponding address information as a function of the particular instruction type. The trace recording hardware may be set into one of two modes by the user. In the first mode, the trace recording hardware stalls the processor core when it reaches its maximum storage capacity for instruction type and/or address data until storage becomes available. In the second mode, when the trace recording hardware becomes full it discards data received from the processor core and stores an overflow indicator. The program trace may be initiated and stopped by the user or by signals internal to the digital microprocessor.

28 Claims, 7 Drawing Sheets

1

APPARATUS AND METHOD FOR REAL-TIME PROGRAM MONITORING VIA A SERIAL INTERFACE

BACKGROUND OF THE INVENTION

1. Field of the Invention

The present invention relates generally to digital microprocessor devices, and more particularly to a digital microprocessor capable of on-chip real-time non-invasive tracing of the execution of program instructions via a serial interface.

2. Description of the Related Art

One of the most essential debugging tools used by programmers and software engineers is a program trace which is representative of the stream of instructions executed by a digital microprocessor. By examining the instruction stream that was executed, a user (e.g., a programmer or a software engineer) may determine if the application hardware and software are performing properly. For example, if unintended behavior of the hardware or software is detected, the user may determine what caused the behavior.

The application area addressed by the invention is that of integrated circuits incorporating digital microprocessors used in embedded systems. An embedded system is one in which the microprocessor does not have the usual interfaces present when developing the software which runs on the system. Frequently, these systems are not general purpose and perform a fixed function. Examples of embedded systems include telephones, printers and disk drives. Unlike a desktop system, such as a personal computer, these systems do not have a keyboard and display to be used to debug and verify the interaction of the software and the hardware. Furthermore, the marketplace for these products frequently demands that they be physically small in size, thin, and lightweight. These demands force the use of small, thin, and fine-pitch integrated circuit packages mounted on densely populated printed circuit boards. Fine-pitch circuits have closely spaced package pins, and, as a result of the small package size, only those pins that are essential to the system's function are present (i.e., a normal pin-out chip). Extra pins which would facilitate the debugging process and, in particular, permit collection of a program trace, are not typically provided on such packages. A package that does provide such extra pins is commonly referred to as a bond-out chip.

As would be understood by one skilled in the art, most commonly, a program trace is obtained by connecting a logic analyzer device to a normal pin-out chip or a special bond-out chip which is connected to the digital processor being debugged. A logic analyzer device may be a logic analyzer or an in-circuit emulator, both of which are well-known in the art. The logic analyzer typically records a trace of the signals observable on the pins of either the normal pin-out chip or the bond-out pin-out chip. This approach has several limitations in the area of embedded systems. First, it is difficult to reliably connect a logic analyzer device to the pins of the thin, fine-pitch packages of densely populated circuit boards commonly used in embedded systems (such as cellular telephones). Second, a logic analyzer device cannot be connected at all unless board space around the chip to be monitored is left empty to accommodate the logic analyzer connector. This requirement directly increases the size of the embedded system. Furthermore, the logic analyzer device can monitor only those signals which are available at the package pins of the chip to be monitored. Frequently, the signals required for a program trace are not available at the package pins of a normal pin-out chip. Thus, collecting a program trace would require either operating the system in a mode which forces internal signals to the package pins, thus sacrificing the system timing, or the use of a bond-out pin-out chip in the embedded system, thus sacrificing small size.

In an effort to expand debugging options available to users, several approaches have been developed. One approach, described in commonly assigned U.S. Pat. No. 5,355,369 to Greenberger et al., loads a test program into the digital processor and then scans out the result data via a Joint Test Access Group (JTAG) port present on most digital processors. The JTAG port is a standard part used for testing integrated circuits. This standard has been adopted by the Institute of Electrical and Electronic Engineers, Inc., and is now defined as the IEEE Standard 1149.1, *IEEE Standard Test Access Port and Boundary-Scan Architecture*, which is incorporated herein by reference. The use of the JTAG port for testing is advantageous because no special bond-out chip or logic analyzer is required. However this approach does not provide the user with a program trace needed for most debugging operations. Instead, it allows the user to shift test instructions via the JTAG port into the digital processor on-chip memory and then scan out the test results executed by the digital processor through a JTAG port test data out (TDO) pin after the digital processor completes its operation. Thus, while this approach allows specific testing of some processor functions, a program trace which is necessary for debugging of the full range of processor functions cannot be obtained in this manner.

Another approach to obtaining program tracing uses the Greenberger approach to load an instruction into the digital processor, wait for the processor to execute it, halt the operation of the program and shift the result out. In this manner, a program trace may be obtained one instruction at a time. However, this technique is quite cumbersome and slow, since it requires halting the execution of the program on every instruction.

Yet another approach addresses prior art deficiencies in obtaining program tracing by using a discontinuity buffer connected to a processor core of the digital processor to obtain a limited program trace. Certain program instructions are called discontinuities because their execution requires the processor to discontinue the program's normal sequential instruction stream and direct the program's execution to a different, non-sequential address. As would be understood by a person skilled in the art, these discontinuities include jumps, calls, and events (such as hardware interrupts). When an executing program successfully reaches a discontinuity instruction it may be assumed that all sequential instructions prior to the discontinuity instruction were executed properly. As a result, it is riot necessary to trace all of the instructions executed by the digital processor. Thus, the discontinuity buffer only records the fact that a discontinuity has occurred, the address at which it occurred, and the address of the next program instruction executed (i.e., the destination address). Since the user is assumed to possess a program listing of all processor instructions and their addresses, the limited program trace showing only discontinuities may be used by the user to reconstruct the full operation of the digital processor by following the trail of executed discontinuities. Most importantly, the limited program trace may be shifted out of the digital processor via a serial port, such as a JTAG port, so that no bond-out chip is required.

While the limited trace approach has significant advantages over the prior art program trace approaches, it also has certain deficiencies. The discontinuity buffer records discontinuity addresses in a last-in-first-out manner (LIFO) while the processor core is executing the program. Because of the size of the pairs of addresses (typically 16–32 bits each) recorded for each discontinuity, it is impossible to continuously scan out the program trace in real-time while the processor core is running due to the difference in frequency between the processor core and the serial port. For example, the JTAG test-data-out (TDO) pin operates at a significantly lower frequency than the typical processor core. As a result, the discontinuity buffer may only be accessed when the processor core is halted. Because of the nature of a LIFO buffer, only the last few discontinuity addresses recorded by the discontinuity buffer may be obtained. Thus, obtaining a program trace via the above approach involves frequently shutting down the core processor and shifting out the contents of the discontinuity buffer, which is inconvenient. Furthermore, the discontinuity buffer does not provide a trace of conditionally executed instructions, such as "IF/THEN/ELSE" instructions because they are not true discontinuities. As a result, the limited trace contains no information about whether these instructions were executed. A trace of these instructions may be very important in debugging most programs. Finally, the discontinuity trace buffer is typically initiated only by a user via an external control pin.

SUMMARY OF THE INVENTION

In accordance with the present invention, an abbreviated program trace is provided by on-chip hardware of a digital processor to an external debug host computer. The abbreviated trace preferably contains the minimum information necessary for a user to reconstruct a full program trace with reference to a program listing.

The present invention includes trace recording hardware which is external to a processor core of a digital microprocessor having a serial port (such as a JTAG port). The trace recording hardware receives, via an instruction type line, data indicative of instruction types executed by the processor core and also receives, via an inter-module bus, data indicative of program addresses corresponding to the instruction types received via the instruction type bus. The trace recording hardware includes an address first-in-first-out (FIFO) buffer for storing addresses received by the trace recording hardware, and an instruction type FIFO buffer for storing instruction types received by the trace recording hardware. The trace recording hardware also includes a trace buffer control capable of identifying at least three pre-defined instruction types, preferably discontinuity and conditionally executed instructions. Each of the at least three pre-defined instruction types has an associated abbreviation scheme for its corresponding address information. The trace buffer control analyzes the stream of instruction types and corresponding addresses received from the processor core and applies an abbreviation scheme for address information of when a particular instruction type is identified as one of the at least three pre-defined instruction types. In addition, the trace recording hardware is capable of identifying whether a particular instruction type was actually executed by the processor core. The trace recording hardware then stores the instruction type and, optionally, data indicative of whether the instruction type was actually executed, in the instruction type FIFO, and stores its associated abbreviated address in the address FIFO. The contents of the FIFOs, which are representative of an abbreviated program trace, are then shifted out through the serial port.

DETAILED DESCRIPTION OF THE PREFERRED EMBODIMENT

Figure 1:
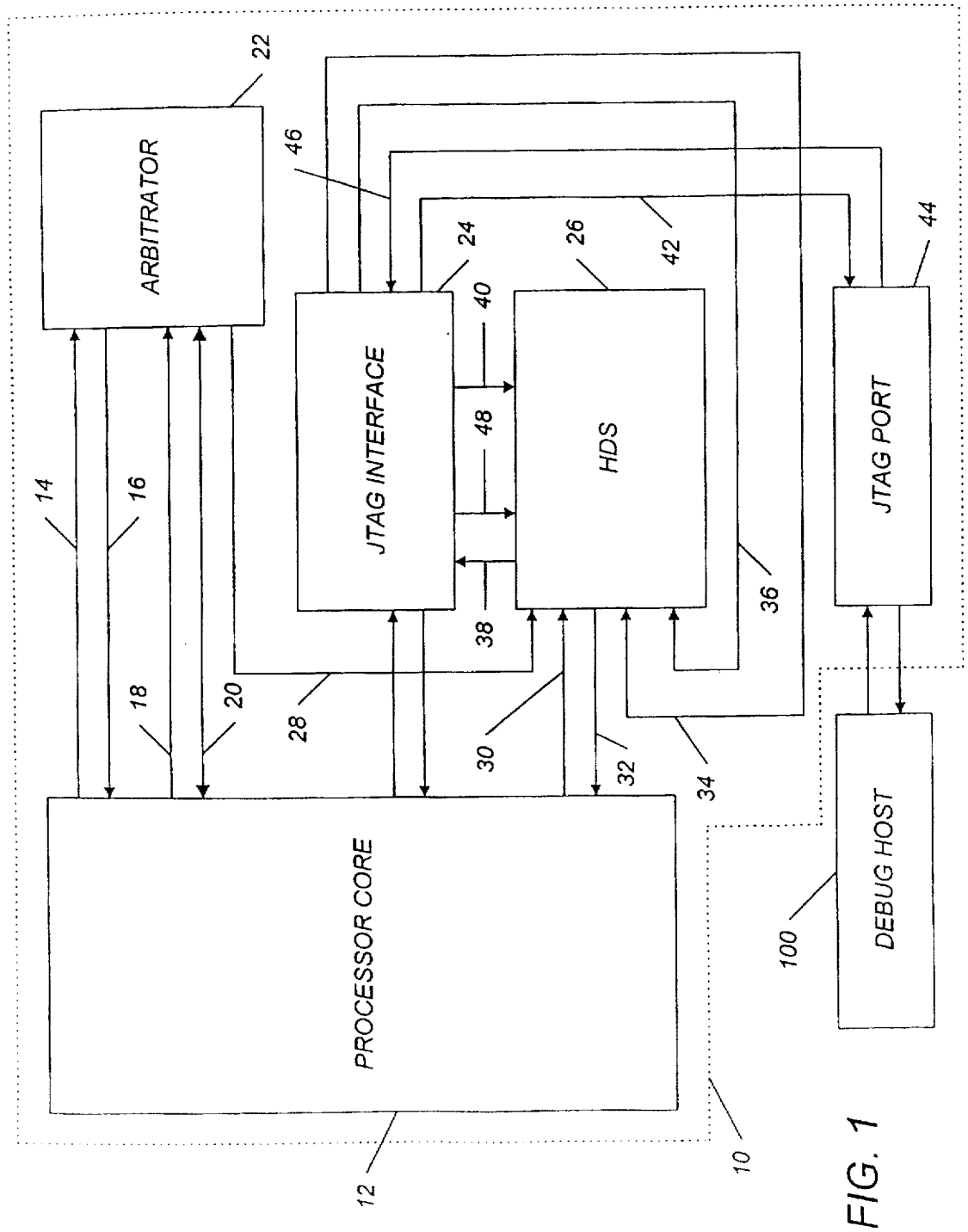
FIG. 1 is a block diagram of a digital processor incorporating a hardware development system (HDS) block and a JTAG interface in accordance with the present invention.

Although the present invention is described with reference to a specific embodiment of a digital microprocessor using a JTAG port for data output, it should be understood that the real-time program tracing mechanism of the present invention may be adapted for use with other digital processing devices having comparable hardware capabilities and serial data outputs including, by way of example, microprocessors, microcontrollers and digital signal processors having limited bandwidth serial data outputs. All such variations are intended to be included within the scope of the present invention. It will be recognized that, in the drawings, only those signal lines and processor blocks necessary for the operation of the present invention are shown.

The present invention allows the user to obtain a continuous abbreviated program trace in real-time via a digital processor's serial port, such as a JTAG port without requiring either external tracing hardware or having to halt the execution of the program. The present invention also includes non-discontinuity conditionally executed instructions in the abbreviated program trace. Finally, the present invention is capable of initiating and stopping program tracing automatically without direct user intervention.

Referring initially to FIG. 1, a digital microprocessor 10 is shown. A processor core 12 controls the operation of the microprocessor 10. The processor core 12 receives data and instructions via lines 16 and 20 from an arbitrator block 22, and outputs instruction and data addresses to the arbitrator block 22 via lines 14 and 18. A Joint Test Action Group (JTAG) interface 24, coupled to the processor core 12, is provided for interpreting JTAG signals received from an external debug host computer 100. The JTAG interface 24 is coupled to a JTAG port 44 which enables the digital microprocessor 10 to connect to other external serial JTAG devices (not shown) and to the debug host computer 100.

A hardware development system (HDS) block 26, coupled to the JTAG interface 24 and the processor core 12, supports stand-alone debugging of the digital microprocessor 10 by the external debug host computer 100 connected to the digital microprocessor 10 via the JTAG port 44. Thus, debugging of the digital microprocessor 10 may be accomplished through the HDS block 26, via the JTAG port 44 and the JTAG interface 24, without the need for a bond-out chip or an in-circuit program emulator. In accordance with the present invention, the HDS block 26 includes a trace buffer control block 50 (herewith described in greater detail in connection with FIG. 2) which enables continuous on-chip program tracing of the instructions executed by the processor core 12 to be scanned out to the debug host computer 100 via the JTAG interface 24 and the JTAG port 44.

An inter-module bus 28, which incorporates the instruction and data lines 14 and 18 from the processor core 12 into a single shared bus, connects the arbitrator block 22 and the HDS block 26. The inter-module bus 28 enables the HDS block 26 to receive signals representative of addresses of program instructions executed by the processor core 12. A line 30 enables the processor core 12 to transmit, to the HDS block 26, signals indicative of types of program instructions executed by the processor core 12. A line 32 enables the HDS block 26 to assert, to the processor core 12, a signal causing the processor core 12 to temporarily stall its operation as long as the signal is asserted. A line 34 enables the debug host computer 100, through the JTAG interface 24, to transmit to the HDS block 26 a signal indicative of whether stalling of the processor core 12 via the line 32 is enabled. A line 36 allows the debug host computer 100 to transmit a "TRACE_START"signal to the HDS block 26, via the JTAG port 44 and the JTAG interface 24, triggering on-chip program tracing. A line 38 enables the HDS block 26 to transmit the on-chip program trace to the debug host computer 100 via the JTAG interface 24 and the JTAG port 44. A line 40 allows the debug host computer 100 to transmit a "TRACE_END" signal to the HDS block 26, via the JTAG port 44 and the JTAG interface 24, ending on-chip program tracing. A line 48 enables the JTAG interface 24 to assert a "TRACE_CAPTURE" signal to the HDS block 26, which indicates that the JTAG interface 24 is ready to receive the program trace data. Lines 42 and 46 enable the JTAG interface 24 to send to and receive signals from, respectively, the debug host computer 100 via the JTAG port 44. The JTAG port 44 may be connected to other serial JTAG devices or directly to the debug host computer 100.

Figure 2:
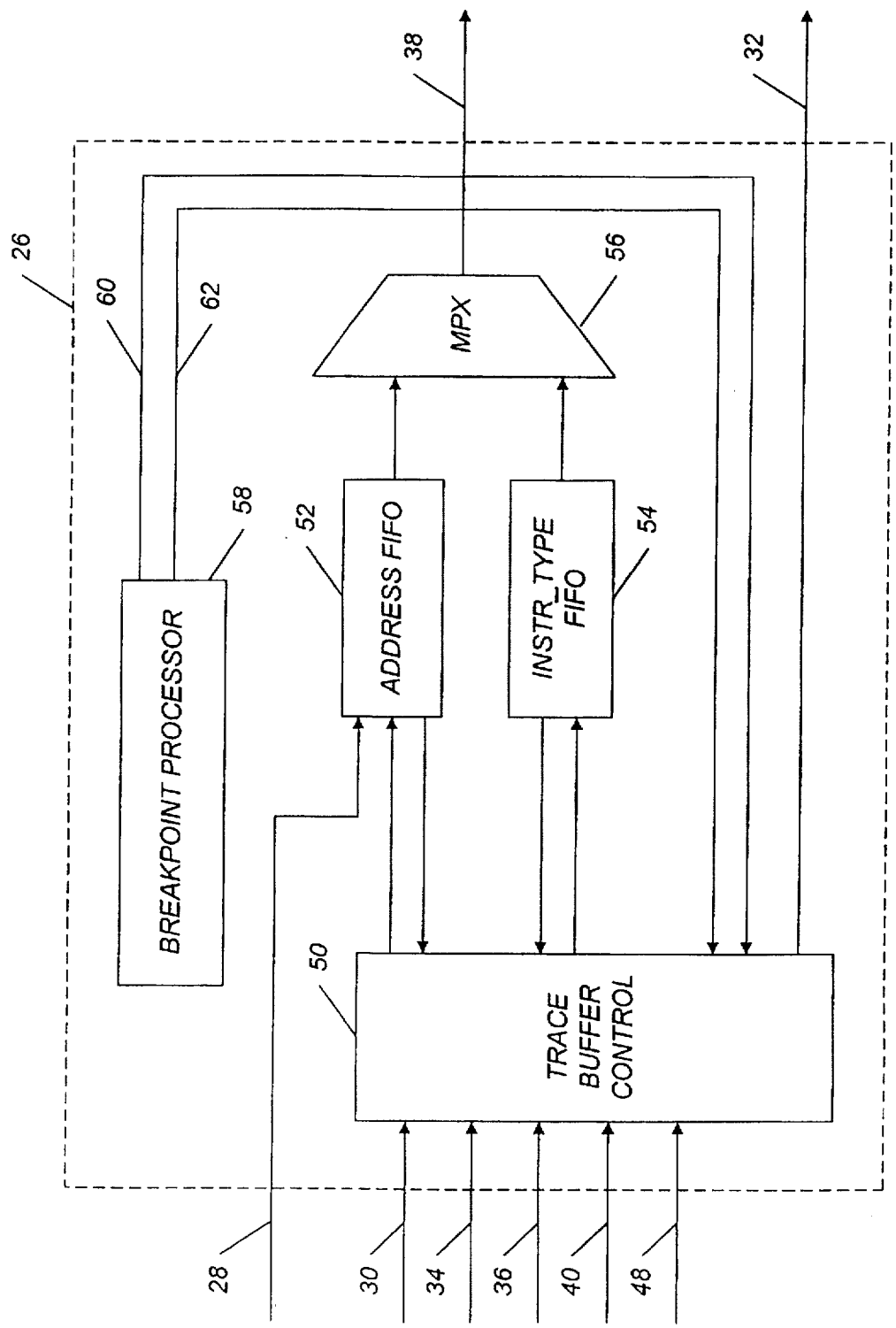
FIG. 2 is a block diagram of an exemplary embodiment of the HDS block of FIG. 1 for implementing on-chip real-time program tracing in accordance with the present invention.

Referring now to FIG. 2, the HDS block 26 is shown in greater detail. A trace buffer control (TBC) block 50 controls the operation of the HDS block 26 with respect to on-chip program trace. In accordance with the present invention, the TBC block 50 enables on-chip real-time program tracing by recording only the minimum details about the discontinuity and conditionally executed instructions and their addresses necessary for the user to re-construct a full program trace. The discontinuity and conditionally executed instructions are received as INSTR_TYPE signals from the processor core 12 which indicate the type of each instruction executed. Preferably, at least three types of discontinuities, well known in the art, are pre-defined in the TBC block 50. By identifying an INSTR_TYPE as one of the three types of pre-defined discontinuities, the TBC block 50 may determine whether to record or to discard its corresponding address (or addresses) and whether additional information about the INSTR_TYPE needs to be recorded.

The first discontinuity type, "type_1," is preferably an event, including, but not being limited to, a hardware interrupt, a "reset" signal, or an exception, such as "divide by zero". For this type of discontinuity it is necessary to record the address from which the event originated (RETURN_ADDR) and the event's destination address (DEST_ADDR), preferably abbreviated to a much smaller DEST_VECTOR. Because events relate to some state in the digital processor not referenced in the program listing, it would be impossible to reconstruct the processor core 12 execution of the event without having both addresses. The second discontinuity type, "type_2," is preferably a register indirect instruction, including, but not being limited to, a register indirect jump or call. For a type_2 discontinuity it is necessary to record only the DEST_ADDR because the origin address may be easily determined by looking at a program listing. The third discontinuity type, "type_3," is preferably a program counter relative or absolute address instruction, including, but not being limited to, a program counter relative or absolute address jump or call. For type_3 discontinuities it is not necessary to record an address at all, because both the origin and the DEST_ADDR may be easily determined from the program listing. Rather, only an indicator of whether the type_3 discontinuity was actually executed (EXECUTED_IND) is required. Conditionally executed instructions, such as if-then-else, are not discontinuities per se, but may treated as a type_3 discontinuity for purposes of the present invention. The operation of the TBC block 50 is described in greater detail below in connection with FIGS. 3–7.

An address first-in-first-out buffer (address FIFO) 52, coupled to the TBC block 50, is provided for temporarily storing addresses, such as DEST_ADDR, DEST_VECTOR, and RETURN_ADDR, of instructions processed by the processor core 12. An instruction type (INSTR_TYPE) FIFO 54, coupled to the TBC block 50, is provided for temporarily storing INSTR_TYPEs and related data, such as EXECUTED_IND. Preferably, the TBC block 50 encodes the INSTR_TYPE before loading it into the INSTR_TYPE FIFO 54 to enable the FIFO 54 to store more data and to minimize the size of the signal which will eventually be transmitted to the JTAG interface 24. A typical encoding scheme is the Huffman encoding method. A multiplexer 56 combines the outputs of the address FIFO 52 and INSTR_TYPE FIFO 54 into a single signal which is transmitted to the JTAG interface 24 via the line 38.

A breakpoint processor block (breakpoint block) 58, as known to those skilled in the art, monitors the instructions received by the processor core 12 for breakpoints, and stops program execution or triggers various digital microprocessor 12 functions in response to breakpoint instructions. A line 60 enables the breakpoint block 58 to transmit a "TRACE_START" signal to the TBC block 50 to trigger the on-chip program trace when a particular breakpoint instruction is detected. Similarly, a line 62 enables the breakpoint block 58 to transmit a "TRACE_END" signal to the TBC block 50 to end a current on-chip program trace when another particular breakpoint instruction is detected.

Before describing the operation of the TBC block 50 in greater detail, it would be helpful to briefly discuss its structure. The TBC Block 50 operates in two stages, a loading stage and an output stage. At the loading stage, the TBC block 50 loads INSTR_TYPEs and applicable ADDR data into the INSTR_TYPE and address FIFOs 54 and 52 respectively. During the output stage, the TBC block 50 shifts out the INSTR_TYPEs and applicable ADDR data to the JTAG interface 24. However since the processor core 12 operates at a much greater clock speed (e.g., 13 Mhz) than the JTAG interface 24 (e.g., 2 Mhz), the FIFOs 52 and 54 may become full quickly, because their contents are not shifted out at a sufficient speed and because the FIFOs can store only a limited amount of entries. To address this problem, the present invention allows the TBC block 50 to be set into one of two modes. In the first mode, which prevents data loss during the program trace, the processor core is stalled until both FIFO 52 and 54 are no longer full. In the second mode, which may result in some data loss during the program trace, an OVERFLOW indicator is stored in the INSTR_TYPE FIFO 54 when data loss due to either or both FIFOs being full occurs. In order to coordinate the two stages, the TBC block 50 is provided with three flags indicating whether the FIFOs 52 and 54 are full or empty. When the address FIFO 52 becomes full, an "address FIFO full" (AF_FULL) flag is set to "ON" at the TBC block 50. The AF_FULL flag is set to "OFF" when the address FIFO 52 is no longer full. When the INSTR_TYPE FIFO 54 becomes full, an "INSTR_TYPE FIFO full" (ITF_FULL) flag is set to "ON" at the TBC block 50. Similarly, when the INSTR_TYPE FIFO 54 is no longer full, the ITF_FULL flag is set to "OFF." When the INSTR_TYPE FIFO 54 becomes empty, as may occur at an end or at a beginning of a program trace, a "FIFO_EMPTY" flag is set at the TBC block 50 to "ON." Similarly, when the INSTR_TYPE FIFO 54 is no longer empty, the FIFO_EMPTY flag is set to "OFF."

Figure 3:
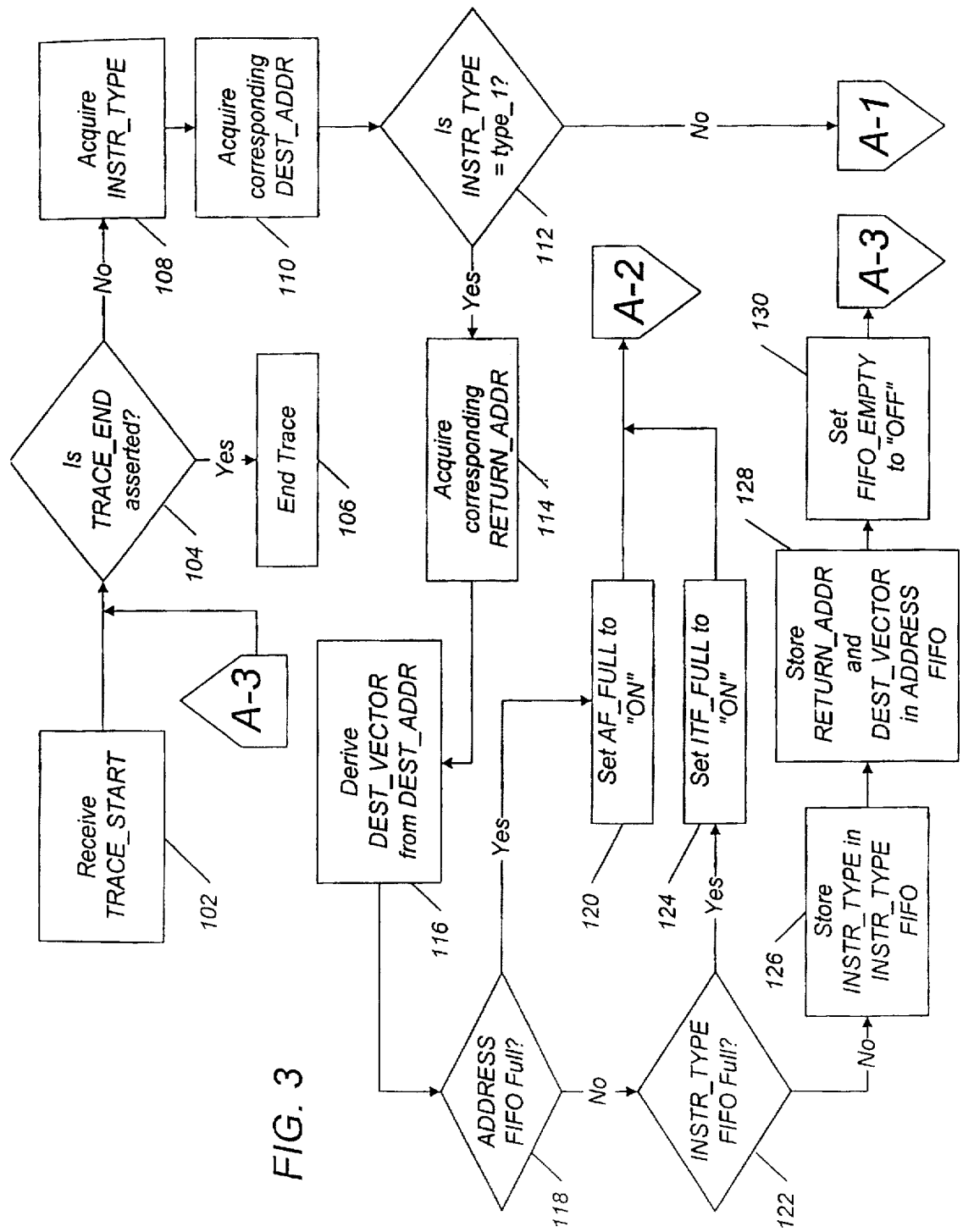
FIGS. 3–5 show a logic diagram representative of the operation of a loading stage of the HDS block of FIG. 2 in accordance with the present invention.
Figure 4:
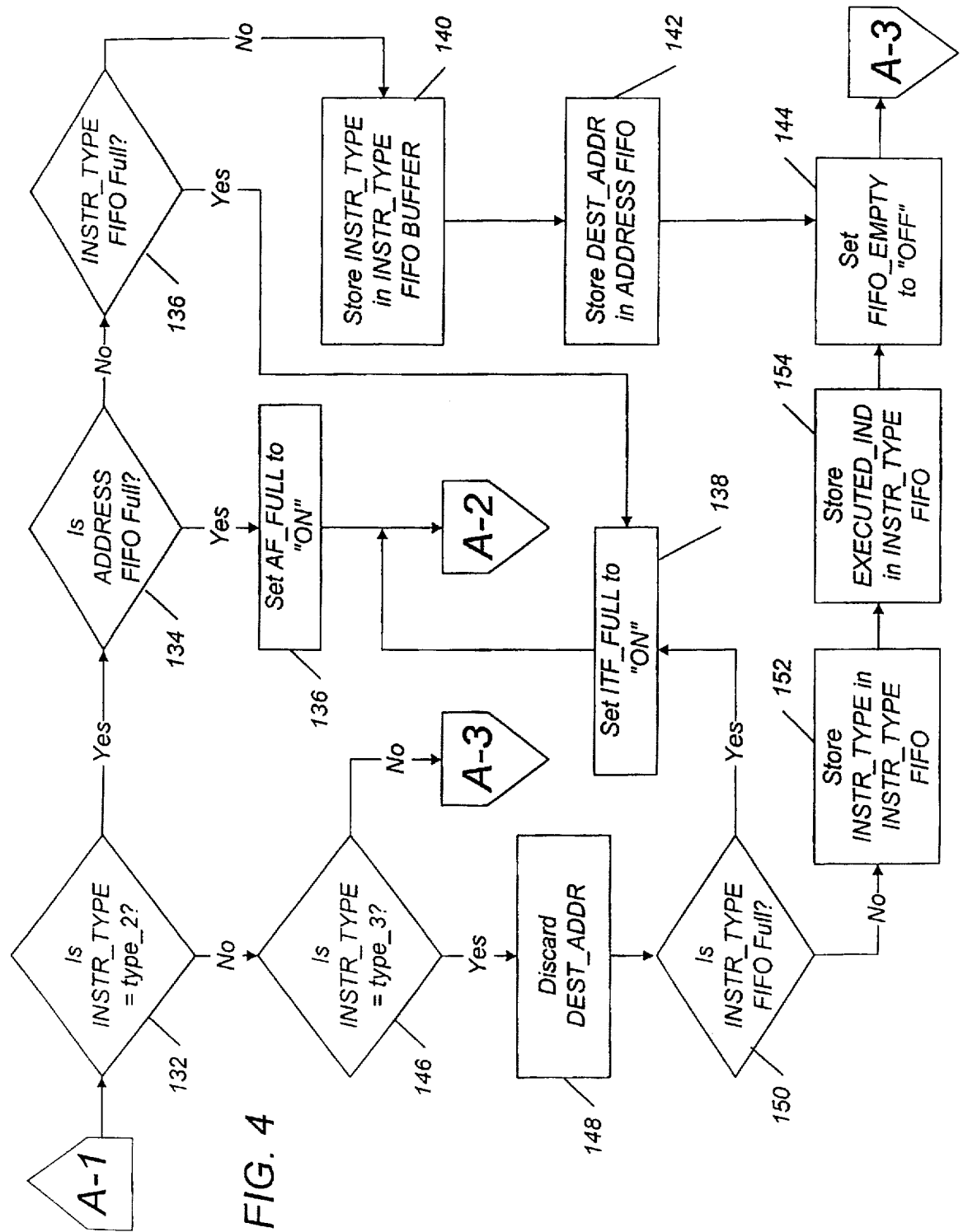
Figure 5:
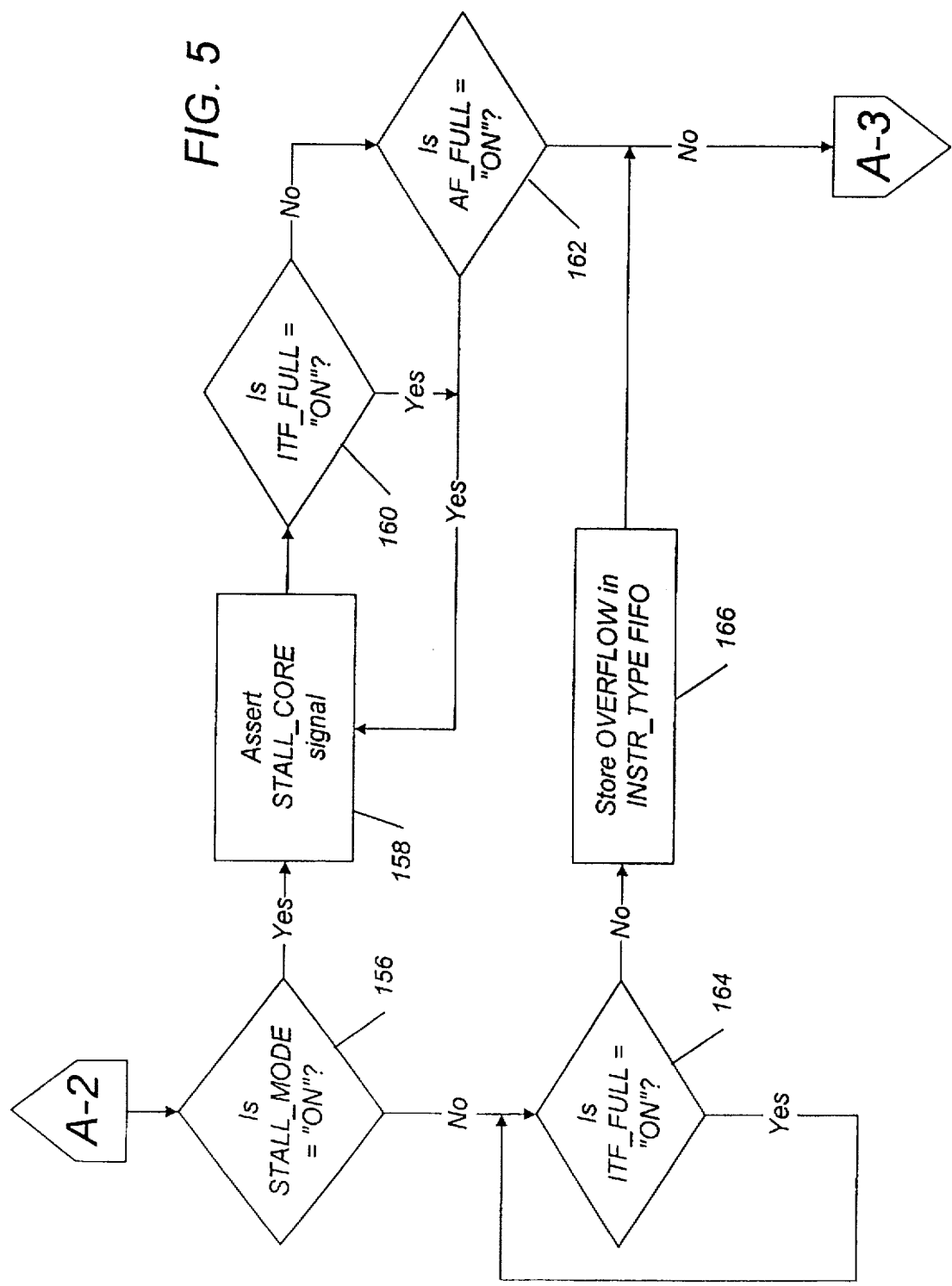

Referring now to FIGS. 3-5, the operation of the loading stage of the TBC block 50 of a preferred embodiment of the present invention is shown in greater detail. The operation starts at step 102 when the TBC block 50 receives a TRACE_START signal from the debug host computer 100 via the line 36 or from the breakpoint block 58 via line 60. At a test 104, the TBC block 50 checks if the TRACE_END signal is asserted by the debug host computer 100 via the lines 40, or by the breakpoint block 58 via line (52. If the TRACE_END signal is asserted, the TBC block 50 ends the program trace at step 106. Otherwise, at step 108, the TBC block 50 acquires the INSTR_TYPE signal from the processor core 12 via, the line 30, and then acquires the DEST_ADDR of that INSTR_TYPE form the arbitrator block 22 via the inter-module bus 28.

At test 112, the TBC block 50 determines whether the INSTR_TYPE received at step 108 is of type_1. If it is, the TBC block 50 acquires the corresponding RETURN_ADDR from the arbitrator block 22 at step 114. At step 116, the TBC block 50 derives a DEST_VECTOR from the DEST_ADDR acquired at step 110. At test 118, the TBC block 50 checks if the address FIFO 52 is full. If the FIFO 52 is full, at step 120, the TBC block 50 sets the AF_FULL flag to "ON" and then proceeds to step 156. If the FIFO 52 is not full, then at test 122 the TBC block 50 checks if the INSTR_TYPE FIFO 54 is full. If the FIFO 54 is full, at step 124 the TBC block 50 sets the ITF_FULL flag to "ON" and then proceeds to step 156. If the FIFO 54 is not full, at step 126 the TBC block 50 stores the INSTR_TYPE acquired at step 108 in the INSTR_TYPE FIFO 54. Preferably, the TBC block 50 encodes the INSTR_TYPE prior to storing it in the INSTR_TYPE FIFO 54 to decrease the INSTR_TYPE's size. At step 128, the TBC block 50 stores the RETURN_ADDR and DEST_VECTOR in the address FIFO 52. At step 130, the TBC block 50 sets the FIFO_EMPTY flag to "OFF" since the INSTR_TYPE FIFO 54 now has data.

At test 132, the TBC block 50 determines whether the INSTR_TYPE received at step 108 is of type_2. If it is, at test 134 the TBC block 50 checks if the address FIFO 52 is full. If the FIFO 52 is full, at step 136 the TBC block 50 sets the AF_FULL flag to "ON" and then proceeds to step 156. If the FIFO 52 is not full, at test 136 the TBC block 50 checks if the INSTR_TYPE FIFO 54 is full. If the FIFO 54 is full, at step 138 the TBC block 50 sets the ITF_FULL flag to "ON" and then proceeds to step 156. If the FIFO 54 is not full, at step 140 the TBC block 50 stores the INSTR_TYPE acquired at step 108 in the INSTR_TYPE FIFO 54. Preferably, the TBC block 50 encodes the INSTR_TYPE prior to storing it in the INSTR_TYPE FIFO 54 to decrease the INSTR_TYPE's size. At step 142, the TBC block 50 stores the DEST_ADDR in the address FIFO 52. At step 144, the TBC block 50 sets the FIFO_EMPTY flag to "OFF" since the INSTR_TYPE FIFO 54 now has data.

If at test 132 the TBC block 50 determined that the INSTR_TYPE was not type_2, at test 146 the TBC block 50 determines if the INSTR_TYPE is type_3. If it is, the TBC block 50 discards the DEST_ADDR at step 148. At test 150, the TBC block 50 checks if the INSTR_TYPE FIFO 54 is full. If the FIFO 54 is full, at step 138 the TBC block 50 sets the ITF_FULL flag to "ON" and then proceeds to step 156. If the FIFO 54 is not full, at step 152 the TBC block 50 stores the INSTR_TYPE acquired at step 108 in the INSTR_TYPE FIFO 54. Preferably, the TBC block 50 encodes the INSTR_TYPE prior to storing it in the INSTR_TYPE FIFO 54 to decrease the INSTR_TYPE's size. At step 154, the TBC block 50 stores the EXECUTED_IND in the INSTR_TYPE FIFO 54. The value of EXECUTED_IND indicates whether the INSTR_TYPE acquired at step 108 was executed by the processor core 12. The TBC block 50 then sets the FIFO_EMPTY flag to "OFF" at step 144 since the INSTR_TYPE FIFO 54 now has data. The TBC block 50 then returns to step 104 where it acquires the next INSTR_TYPE.

At step 156, the TBC block 50 determines if STALL_MODE has been set to "ON" by the debug host computer 100 via the line 34. If STALL_MODE is "ON," at a step 158 the TBC block 50 asserts a STALL_CORE signal to the processor core 12 via the line 32, which causes the processor core 12 to temporarily freeze its operation. At test 160 the TBC block 50 checks if the ITF_FULL flag is "ON." If it is, the TBC block 50 continues to assert the STALL_CORE signal at step 158. If it is "OFF," at test 162 the TBC block 50 checks if the AF_FULL flag is "ON." If it is, the TBC block 50 continues to assert the STALL_CORE signal at step 158. Thus, if either of the FIFOs 52 or 54 is full, the processor core 12 is stalled thereby preventing it from sending new INSTR_TYPES and addresses and allowing time for the FIFOs 52 and 54 to be cleared by the output stage. If the AF_FULL flag is "OFF," the TBC block 50 returns to step 104 where the next INSTR_TYPE is acquired.

If at test 156 the TBC block 50 determined that the STALL_MODE flag was set to "OFF," at a test 164 the TBC block 50 scans the ITF_FULL flag as long as it is set to "ON." As a result, new INSTR_TYPEs and addresses received by the TBC block 50 from the processor core 12 are discarded during this scan. When the ITF_FULL flag becomes "OFF," the TBC block 50 stores an OVERFLOW indicator in the INSTR_TYPE FIFO 54 at step 166 to indicate that some data loss may have occurred. The TBC block 50 then returns to step 104.

Figure 6:
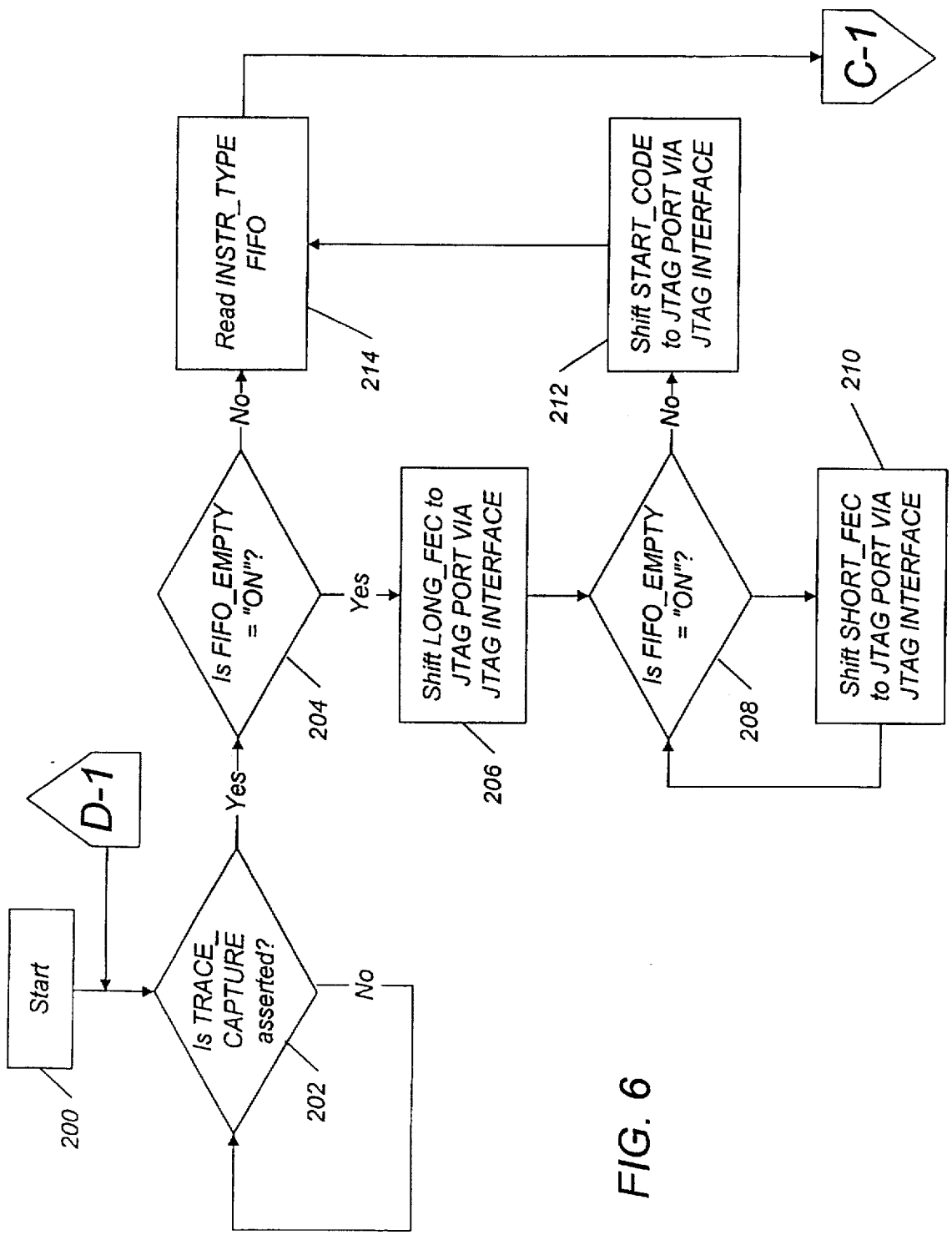
FIGS. 6–7 show a logic diagram representative of the operation of an output stage of the HDS block of FIG. 2 in accordance with the present invention.
Figure 7:
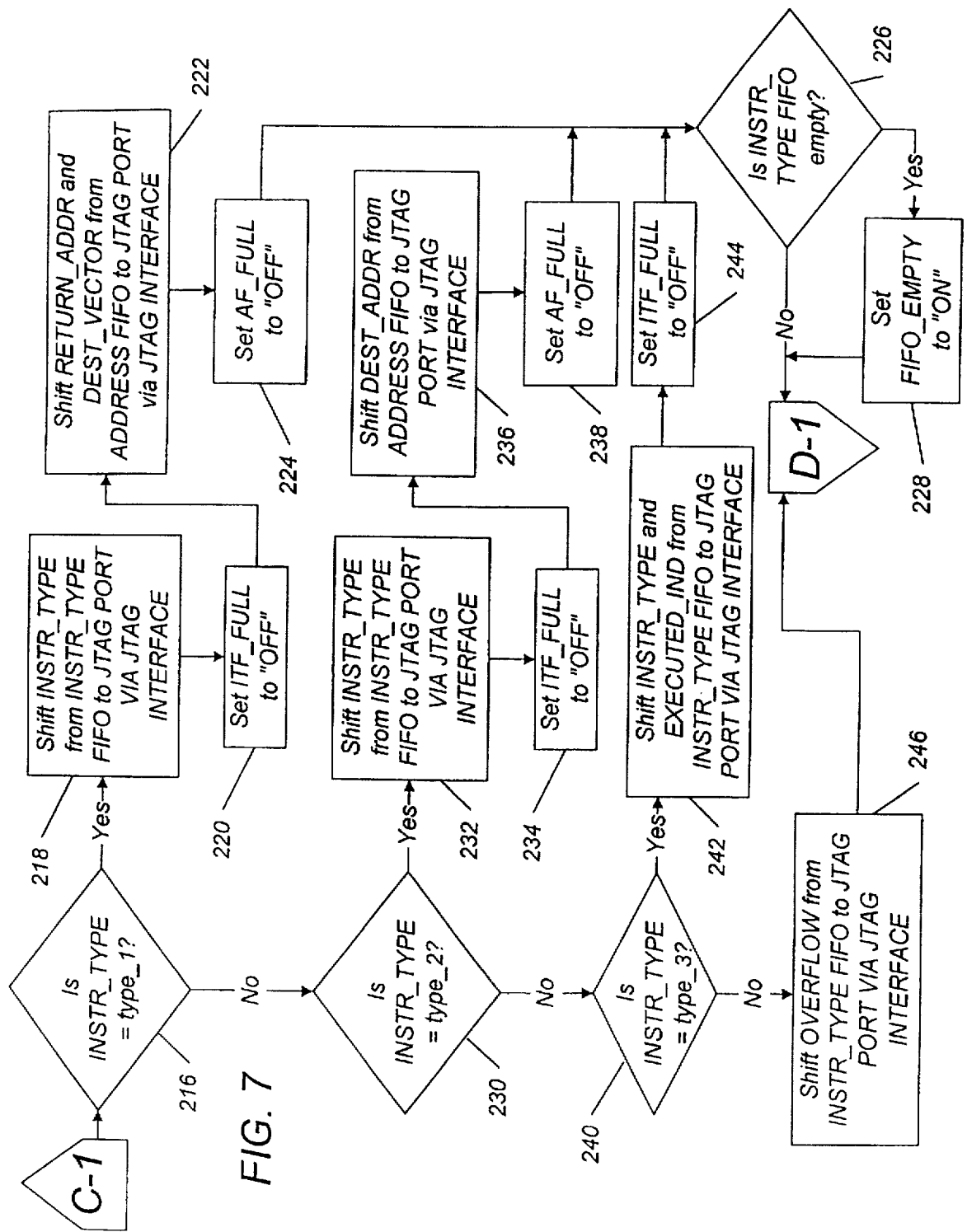

Referring now to FIGS. 6-7, the operation of the output stage of the TBC block 50 of a preferred embodiment of the present invention is shown in greater detail. The output stage operates independently from the input stage described above in connection with FIGS. 3-5. However both stages are linked by sharing the flags AF_FULL, ITF_FULL, and FIFO_EMPTY.

The operation of the output stage starts at step 200. At test 202 the TBC block 50 scans for a TRACE_CAPTURE signal from the JTAG interface 24. When the TRACE_CAPTURE signal is asserted, the TBC block 50 proceeds to test 204 where it determines if the FIFO_EMPTY flag is set to "ON." If it is, at step 206 the TBC block 50 shifts a long FIFO empty code (LONG_FEC) to the JTAG port 44 indicating that the INSTR_TYPE FIFO is empty. At test 208 the TBC block 50 determines if the FIFO_EMPTY flag is still "ON." For example, the FIFO_EMPTY flag could have been set to "OFF" at steps 130 or 144 in the loading stage of the TBC block 50. If the FIFO_EMPTY flag is still "ON" then the TBC block 50, at step 210, shifts a short FIFO empty code (SHORT_FEC) to the JTAG port 44 indicating that the INSTR_TYPE FIFO is still empty and that the program trace is most likely over. The TBC block 50 then continues to scan for the FIFO_EMPTY flag being turned to "OFF."

When the FIFO_EMPTY flag is turned to "OFF" (for example at steps 130 or 144), the TBC block 50 shifts a START_CODE to the JTAG port 44 at step 212, indicating that a new trace is incoming. At step 214, the TBC block 50 reads the first INSTR_TYPE in the INSTR_TYPE FIFO 54. At test 216 the TBC block 50 determines if the INSTR_TYPE read at step 214 is of type_1. If it is, then at step 218 the TBC block 50 shifts the INSTR_TYPE from the INSTR_TYPE FIFO 54 to the JTAG port 44 to be transmitted to the external debug host computer 100. At step 220 the TBC block 50 sets the ITF_FULL flag to "OFF" since the INSTR_TYPE FIFO 54 is no longer full. At step 222 the TBC block 50 shifts the RETURN_ADDR and DEST_VECTOR from the address FIFO 52 to the JTAG port 44 to be transmitted to the external debug host computer 100. At step 224 the TBC block 50 sets the AF_FULL flag to "OFF" since the address FIFO 52 is no longer full. At test 226 the TBC block 50 determines if the INSTR_TYPE FIFO is empty. If it is, the TBC block 50 sets the FIFO_EMPTY flag to "ON" and then returns to test 202.

If at test 216 the TBC block 50 determined that the INSTR_TYPE was not of type_1, then at test 230 the TBC block 50 determines if the INSTR_TYPE is of type_2. If it is, then at step 232 the TBC block 50 shifts the INSTR_TYPE from the INSTR_TYPE FIFO 54 to the JTAG port 44 to be transmitted to the external debug host computer 100. At step 234 the TBC block 50 sets the ITF_FULL flag to "OFF" since the INSTR_TYPE FIFO 54 is no longer full. At step 236 the TBC block 50 shifts the DEST_ADDR from the address FIFO 52 to the JTAG port 44 to be transmitted to the external debug host computer 100. At step 238 the TBC block 50 sets the AF_FULL flag to "OFF" since the address FIFO 52 is no longer full. The TBC block 50 then proceeds to test 226.

If at test 230 the TBC block 50 determined that the INSTR_TYPE was not of type_2, then at test 240 the TBC block 50 determines if the INSTR_TYPE is of type_3. If it is, at step 242 the TBC block 50 shifts the INSTR_TYPE from the INSTR_TYPE FIFO 54 to the JTAG port 44 to be transmitted to the external debug host computer 100. At step 244 the TBC block 50 sets the ITF_FULL flag to "OFF" since the INSTR_TYPE FIFO 54 is no longer full. The TBC block 50 then proceeds to test 226. If at test 240 the TBC block 50 determined that the INSTR_TYPE was not of type_3, at step 246 the TBC block 50 shifts the OVERFLOW code from the INSTR_TYPE FIFO 54 to the JTAG port 44 to be transmitted to the external debug host computer 100. The TBC block 50 then proceeds to test 226.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An integrated circuit having a digital processor including a serial port and a processor core for executing a plurality of types of instructions input to the digital processor, said integrated circuit comprising:

first receiving means, connected to the processor core, for receiving a first signal indicative of the one of said plural types of instructions processed by the processor core;

second receiving means, connected to the processor core, for receiving a second signal indicative of a destination address of an instruction processed by the processor core and, when said instruction is of a discontinuity type, a return address of said processed instruction;

trace recording means, connected to the first and second receiving means, operable for conducting a program trace of the processor core, said program trace being representative of said first and said second signals, said trace recording means comprising trace compression means being operable to compress said program trace; and output means for sending out said compressed program trace via the serial port.

2. The integrated circuit of claim 1, wherein the trace compression means further comprises:

instruction type storing means operable to store at least one instruction type received by said first receiving means;

address storing means operable to store at least one address received by said second receiving means; and trace control means operable for defining at least one of the plural types of instructions, and for determining whether said one instruction type received by said first receiving means is one of said at least one type of instructions, said trace control means further being operable to:

record the determined instruction type in said instruction type storing means, and record both the return address and data indicative of the destination address of the determined instruction type in said address storing means, when the determined instruction type is of a first instruction type of said at least one instruction type, record the determined instruction type in said instruction type storing means, and record the destination address of the determined instruction type in said address storing means, when the determined instruction type is of a second instruction type of said at least one instruction type, record the determined instruction type, and data indicative of whether the determined instruction type was executed, in said instruction type storing means, and discard the destination address of the determined instruction type when the determined instruction type is of a third instruction type of said at least one instruction type, discard the determined instruction type and the destination address of the determined instruction type when the determined instruction type is not of said at least one instruction type, and combine the contents of said instruction type storing means and said address type storing means to derive said compressed program trace.

3. The integrated circuit of claim 2, wherein said first instruction type is an event discontinuity, wherein said second instruction type is an unconditional register indirect discontinuity, and wherein said third instruction type is one of a program counter relative discontinuity, an absolute addressed discontinuity, and a conditionally executed instruction.

4. The integrated circuit of claim 2, wherein said trace recording means further comprises means for encoding said determined instruction type prior to recording said instruction type in said instruction type storing means, such that said determined instruction type is decreased in size.

5. The integrated circuit of claim 1, wherein the serial port comprises a Joint Test Action Group (JTAG) port.

6. The integrated circuit of claim 1, wherein said output means further comprises means for determining whether the serial port is available for sending out data, and means for sending out said reduced size program trace via the serial port only when the serial port is available.

7. The integrated circuit of claim 1, further comprising first control means connected to said trace recording means for controlling the operation of said trace recording means, said first control means being operable for asserting a start signal and a stop signal to said trace recording means such that when the start signal is asserted, said program trace is triggered by said first control means by enabling said trace recording means to receive instruction types from said first receiving means and addresses from said second receiving means and, when the end signal is asserted, said program trace is terminated by deactivating said trace recording means.

8. The integrated circuit of claim 7, further comprising an external debug host computer connected to said first control means, said external debug host computer being operable to cause said first control means to assert a start signal and a stop signal.

9. The integrated circuit of claim 7, wherein said first control means comprises a breakpoint processor.

10. The integrated circuit of claim 2, further comprising:
second control means, connected to said address storing means and to said instruction type storing means, operable for asserting a third signal when said address storing means becomes full, for deasserting said third signal when said address storing means is no longer full, for asserting a fourth signal when said instruction type storing means becomes full, and for deasserting said fourth signal when said instruction type storing means is no longer full; and third control means, connected to said, trace recording means, for selectively setting said trace recording means into a first mode, such that when said trace control means is set to said first mode and when said second control means asserts at least one of said third signal and said fourth signal, said third control means is operable to cause the processor core to stall until said at least one of said third and fourth signals is deasserted.

11. The integrated circuit of claim 10, further comprising fourth control means, connected to said trace recording means, for selectively setting said trace recording means into a second mode, such that when said trace control means is set to said second mode and when said second control means asserts at least one of said third signal and fourth signal, said fourth control means is operable to discard data indicative of instruction types and corresponding addresses received from the processor core as long as said at least one of said third and fourth signals is asserted, and to store data indicative of an overflow condition in said instruction type storing means as soon as said at least one of said third and said fourth signal is deasserted.

12. The integrated circuit of claim 2 further comprising fifth control means operable for detecting whether said instruction type storing means is empty, and further operable for:

asserting a fifth signal indicative that said instruction type storing means is empty when said fifth control means first detects that said instruction type storing means is empty; and deasserting said fifth signal and asserting a sixth signal, shorter in length than said fifth signal, indicative that said instruction type storing means is empty when said instruction type storing means remains empty immediately after said fifth signal is asserted.

13. A method for implementing on-chip program tracing in an integrated circuit comprising a digital processor having a serial port, a processor core for executing a plurality of types of instructions input to the digital processor, an address storing device and an instruction type storing device, said method comprising the steps of:

(a) receiving, from the processor core a first signal indicative of the one of said plural types of instructions processed by the processor core;

(b) receiving, from the processor core, a second signal indicative of a destination address of an instruction processed by the processor core and also, when the processed instruction is of a discontinuity type, a return address of the processed instruction, wherein the program trace is representative of at least one of said first and second signals;

(c) compressing said program trace; and (d) sending out said compressed program trace via the serial port.

14. The method of claim 13, wherein said step (c) comprises the steps of (e) defining at least one of the plural types of instructions;

(f) determining whether the instruction type received at said step (a) is one of said at least one type of instructions;

(g) recording the determined instruction type in the instruction type storing device, and recording both the return address and data indicative of the destination address of the determined instruction type in the address storing device, when the determined instruction type is of a first instruction type of said at least one instruction type;

(h) recording the determined instruction type in the instruction type storing device, and recording the destination address of the determined instruction type in the address storing device, when the determined instruction type is of a second instruction type of said at least one instruction type;

(i) recording the determined instruction type in the instruction type storing device, recording data indicative of whether the determined instruction type was executed in said instruction type storing device, and discarding the destination address of the determined instruction type, when the determined instruction type is of a third instruction type of said at least one instruction type;

(j) discarding the determined instruction type and the destination address of the determined instruction type when the determined instruction type is not of said at least one instruction type; and (k) combining the contents of the instruction type storing device and said address type storing device to derive said compressed program trace.

15. The method of claim 13, wherein said first instruction type is an event discontinuity, wherein said second instruction type is an unconditional register indirect discontinuity, and wherein said third instruction type is one of a program counter relative discontinuity, an absolute addressed discontinuity, and a conditionally executed instruction.

16. The method of claim 13, wherein the serial port is a Joint Test Action Group (JTAG) port.

17. The method of claim 14, further comprising the step of:

(l) encoding the determined instruction type prior to said step (g), such that the determined instruction type is decreased in size.

18. The method of claim 13 wherein said output means further comprising the steps of:

(m) determining whether the serial port is available for sending out data; and (n) sending out said compressed program trace via the serial port only when the serial port is available.

19. The method of claim 13, further comprising the step of:

(o) asserting a start signal, such that when the start signal is asserted, a program trace is triggered, starting at said step (a).

20. The method of claim 13, further comprising the step of:

(p) asserting a stop signal, such that when the stop signal is asserted, a program trace started at step (a) is immediately terminated.

21. The method of claim 19, wherein said start signal is asserted by an external debug host computer.

22. The method of claim 19, wherein said start signal is asserted by a breakpoint processor.

23. The method of claim 20, wherein said stop signal is asserted by an external debug host computer.

24. The method of claim 20, wherein said stop signal is asserted by a breakpoint processor.

25. The method of claim 13, further comprising the steps of:

(q) asserting a third signal when the address storing device becomes full;

(r) deasserting said third signal when the address storing device is no longer full;

(s) asserting a fourth signal when the instruction type storing device becomes full; and (t) deasserting said fourth signal when the instruction type storing device is no longer full.

26. The method of claim 25, further comprising the steps of:

(u) detecting whether at least one of said third and fourth signals is asserted; and (v) causing the processor core to stall until said at least one of said third and fourth signals is deasserted.

27. The method of claim 25, further comprising the steps of:

(w) detecting whether at least one of said third and fourth signals is asserted;

(x) discarding data indicative of the plurality of instruction types and destination addresses received, at said steps (a) and (b) respectively for as long as said at least one of said third and fourth signal is asserted; and (y) storing data indicative of an overflow condition in the instruction type storing device immediately after said at least one of said third and fourth signal is deasserted.

28. The method of claim 13 further comprising the steps of:

(z) detecting whether the instruction type storing device is empty;

(aa) asserting a fifth signal indicative of the instruction type storing device being empty when it is detected at said step (z) that the instruction type storing device is empty; and (bb) deasserting said fifth signal and asserting a sixth signal, shorter in length than said fifth signal, indicative that said instruction type storing device is empty when said instruction type storing device remains empty immediately after said fifth signal is asserted.

* * * * *